US011463933B2

(12) United States Patent
Yamamoto et al.

(10) Patent No.: US 11,463,933 B2
(45) Date of Patent: Oct. 4, 2022

(54) COMMUNICATION CONTROLLER, TERMINAL DEVICE, AND BASE-STATION DEVICE (71) Applicant: SHARP KABUSHIKI KAISHA, Osaka (JP)

(72) Inventors: Makoto Yamamoto, Osaka (JP); Shuichi Takehana, Osaka (JP); Shigeto Suzuki, Osaka (JP); Kennichi Iijima, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/153,323

(22) Filed: Jan. 20, 2021

(65) Prior Publication Data
US 2021/0235354 A1  Jul. 29, 2021

(30) Foreign Application Priority Data

Jan. 24, 2020  (JP) .............................. JP2020-010034

(51) Int. Cl.
H04W 4/00        (2018.01)
H04W 36/32       (2009.01)
H04W 4/40        (2018.01)
H04W 36/08       (2009.01)

(52) U.S. Cl.
CPC ............. H04W 36/32 (2013.01); H04W 4/40 (2018.02); H04W 36/08 (2013.01)

(58) Field of Classification Search
CPC ....... H04W 36/32; H04W 4/40; H04W 36/08; H04W 36/0033; H04W 36/00835; H04W 4/02; H04W 4/021; H04W 4/023; H04W 36/0016; H04W 4/44; H04W 64/003
USPC ......................................................... 370/329
See application file for complete search history.

(56) References Cited

U.S. PATENT DOCUMENTS 7,194,266 B2 * 3/2007 Ishikawa ............... H04W 36/30
                                                      455/442
8,068,839 B2 * 11/2011 Kurimoto ............. H04W 36/32
                                                      370/332
8,503,360 B2 * 8/2013 Hou ..................... H04B 7/0452
                                                      455/562.1
8,588,787 B2 * 11/2013 Murakami .......... H04W 36/245
                                                      455/439

(Continued)

FOREIGN PATENT DOCUMENTS

JP         2001-069548 A        3/2001

Primary Examiner — Amancio Gonzalez
(74) Attorney, Agent, or Firm — ScienBiziP, P.C.

(57) ABSTRACT

A communication controller includes a position-information acquiring unit, a movement-information acquiring unit, a selector, and a determination unit. The position-information acquiring unit acquires position information of each of a plurality of base-station devices. The movement-information acquiring unit acquires movement information of a terminal device. The selector selects, as a handover candidate, at least one base-station device from among the plurality of base-station devices in accordance with the position information and the movement information. The determination unit determines a base-station device that is a handover destination, in accordance with a result of a cell search performed on the at least one base-station device selected by the selector.

5 Claims, 7 Drawing Sheets (56) References Cited

U.S. PATENT DOCUMENTS

| | | | |
|---|---|---|---|
| 9,137,728 B2* | 9/2015 | Mandapaka | H04W 36/245 |
| 9,161,284 B2* | 10/2015 | Lim | H04W 36/165 |
| 9,949,187 B2* | 4/2018 | Miyagoshi | H04W 36/22 |
| 10,349,325 B2* | 7/2019 | Ouzieli | H04W 64/00 |
| 10,849,033 B2* | 11/2020 | Hou | H04W 36/0088 |
| 10,863,474 B2* | 12/2020 | Raghavan | H04W 36/32 |
| 10,992,364 B2* | 4/2021 | Tang | H04B 7/0617 |
| 2005/0014515 A1* | 1/2005 | Suzuki | H04W 36/32 |
| | | | 455/456.1 |
| 2015/0092676 A1* | 4/2015 | Periyalwar | H04W 4/18 |
| | | | 370/329 |
| 2021/0099933 A1* | 4/2021 | Matsuda | H04W 36/0055 |
| 2022/0014999 A1* | 1/2022 | Otaka | H04W 36/30 |

* cited by examiner

| BASE-STATION DEVICE | DIRECTION |
|---|---|
| SECOND BASE-STATION DEVICE | WEST |
| THIRD BASE-STATION DEVICE | NORTH |
| FOURTH BASE-STATION DEVICE | EAST |
| FIFTH BASE-STATION DEVICE | SOUTH |
| SIXTH BASE-STATION DEVICE | WEST |

COMMUNICATION CONTROLLER, TERMINAL DEVICE, AND BASE-STATION DEVICE

CROSS-REFERENCE TO RELATED APPLICATION

The present application claims priority from Japanese Application JP2020-010034, the content of which is hereby incorporated by reference into this application.

BACKGROUND OF THE INVENTION

Field of the Invention

The present invention relates to a communication controller, a terminal device, and a base-station device.

Description of the Related Art

Conventional mobile communication includes a handover process where a terminal device changes, when moving, a base-station device to be connected. In such a handover process, disclosed is suitably determining a handover-destination base-station device to be connected to the terminal device.

For instance, Japanese Patent Application Laid-Open No. 2001-69548 discloses a mobile communication device that includes the following: a position detecting means for detecting a current position; a machine-readable recording medium storing map information including information about the identifications and positions of base stations; and a search means for searching the recording medium for information about the identifications and positions of surrounding base stations. The mobile terminal device enters a position by reflecting the current position and the position information of the surrounding base stations as well as the intensity of the radio wave of each surrounding base station. This device also includes a traveling-direction detecting means. The device reports, to a base station during communication, the current position information and the direction of travel as well as the intensity of the radio waves of the surrounding base stations, and performs a handover to a target base station determined based on the report by the base station.

SUMMARY OF THE INVENTION

For a plurality of surrounding base-station devices, measuring the intensity of their radio waves and other things unfortunately takes time, possibly failing to perform a handover at a necessary timing.

In particular, 5G communication, a mode of mobile communication, has been increasingly developed. In some cases, 5G communication uses a base-station device having a narrow communication range, such as a millimeter-wave base-station device. The terminal device moving at high speed by vehicle or other means under such circumstances tends to fail to perform a handover at a proper timing.

To solve this problem, it is a main object of the present disclosure to provide a communication controller, a terminal device, a base-station device, a communication system and a vehicle that can rapidly determine a base-station device that is a handover destination.

A communication controller according to one aspect of the present disclosure includes a position-information acquiring unit, a movement-information acquiring unit, a selector, and a determination unit. The position-information acquiring unit acquires position information of each of a plurality of base-station devices. The movement-information acquiring unit acquires movement information of a terminal device. The selector selects, as a handover candidate, at least one base-station device from among the plurality of base-station devices in accordance with the position information and the movement information. The determination unit determines a base-station device that is a handover destination, in accordance with a result of a cell search performed on the at least one base-station device selected by the selector.

A terminal device according to another aspect of the present disclosure includes the communication controller and a first radio communication unit. The first radio communication unit is capable of communicating with a plurality of base-station devices.

A communication system according to still another aspect of the present disclosure includes the terminal device and the plurality of base-station devices.

A vehicle according to yet another aspect of the present disclosure is equipped with the terminal device.

A base-station device according to further another aspect of the present disclosure includes the communication controller and a second radio communication unit. The second radio communication unit is capable of communicating with a terminal device.

A communication system according to still yet another aspect of the present disclosure includes the base-station device and the terminal device.

DETAILED DESCRIPTION OF THE INVENTION

Preferred embodiments for implementing the present invention will be described with reference to the accompanying drawings. The preferred embodiments are examples for describing the present invention, and the technical scope of the invention recited in the claims is thus not limited to descriptions below.

1. First Preferred Embodiment 1.1 System Configuration

Figure 1A:
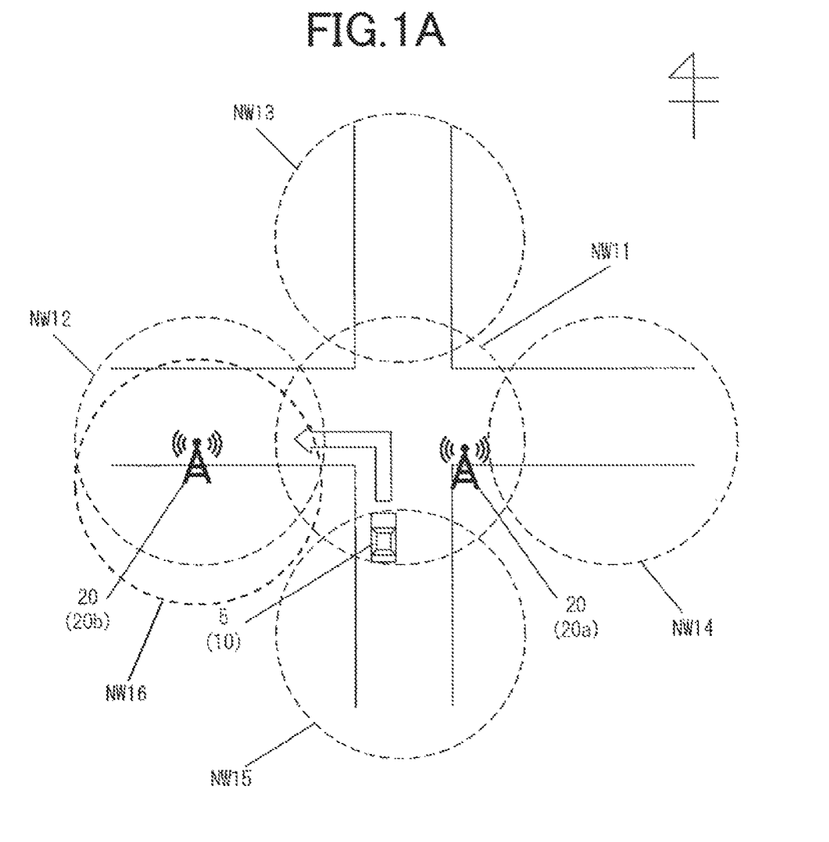
FIG. 1A schematically illustrates a communication system according to a first preferred embodiment.

A system will be outlined with reference to FIG. 1A, FIG. 1A illustrates that a vehicle 5 equipped with a terminal device 10 is communicating with a base-station device 20. There are actually a plurality of base-station devices 20, among which a base-station device 20a and a second base-station device 20b are shown in FIG. 1A and the other base-station devices 20 are omitted.

The drawing shows a communication area NW11 circled with a dotted line, which is an area where the terminal device 10 can communicate with the first base-station device 20a (i.e., a service-available area). The drawing also shows a communication area NW12 circled with a dotted line, which is an area where the terminal device 10 can communicate with the second base-station device 20b. The drawing also shows communication areas NW13, NW14, NW15, and NW16, which are communication-available areas of the respective base-station devices (not shown).

The terminal device 10 is, but not limited to, a smartphone belonging to the driver of the vehicle 5 and capable of using mobile communication. Other than a smartphone, the terminal device 10 is any terminal device that can use mobile communication, including a tablet, a smart watch, and a computer. Alternatively, the terminal device 10 may be a car navigation device installed in the vehicle 5.

In this preferred embodiment, the top of each drawing is a north direction. The vehicle 5 in FIG. 1A is thus traveling northward and is about to turn left toward the west.

Figure 1B:
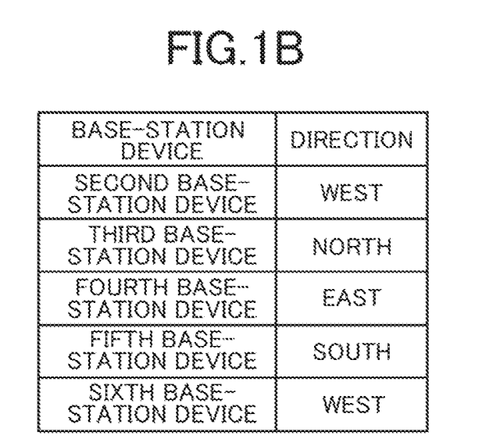
FIG. 1B illustrates information about the positions of surrounding base-station devices.

There are base-station devices in the respective substantial north, south, east and west of the first base-station device 20a. For instance, the second base-station device is in the west of the first base-station device 20a, as illustrated in FIG. 1B. The communication area NW12 in FIG. 1A is an area where the terminal device 10 can communicate with the second base-station device. The communication area NW13 in FIG. 1A is likewise an area where the terminal device 10 can communicate with a third base-station device in the north of the first base-station device 20a. The communication area NW14 in FIG. 1A is an area where the terminal device 10 can communicate with a fourth base-station device in the east of the first base-station device 20a. The communication area NW15 in FIG. 1A is an area where the terminal device 10 can communicate with a fifth base-station device in the south of the first base-station device 20a. The communication area NW16 in FIG. 1A is an area where the terminal device 10 can communicate with a sixth base-station device in the west of the first base-station device 20a.

This preferred embodiment thus addresses five base-station devices in directions where the vehicle 5 can travel. In addition, the terminal device 10 and the base-station device 20 individually have communication-available areas.

The terminal device 10 normally changes its connection counterpart from a currently connected base-station device to a destination base-station device to continue communication. This action is typically called handover. The terminal device 10 in this preferred embodiment selects handover candidates from among a plurality of base-station devices, and determines a base-station device that is a handover destination from among the candidates.

1.2 Functional Configuration

Figure 2:
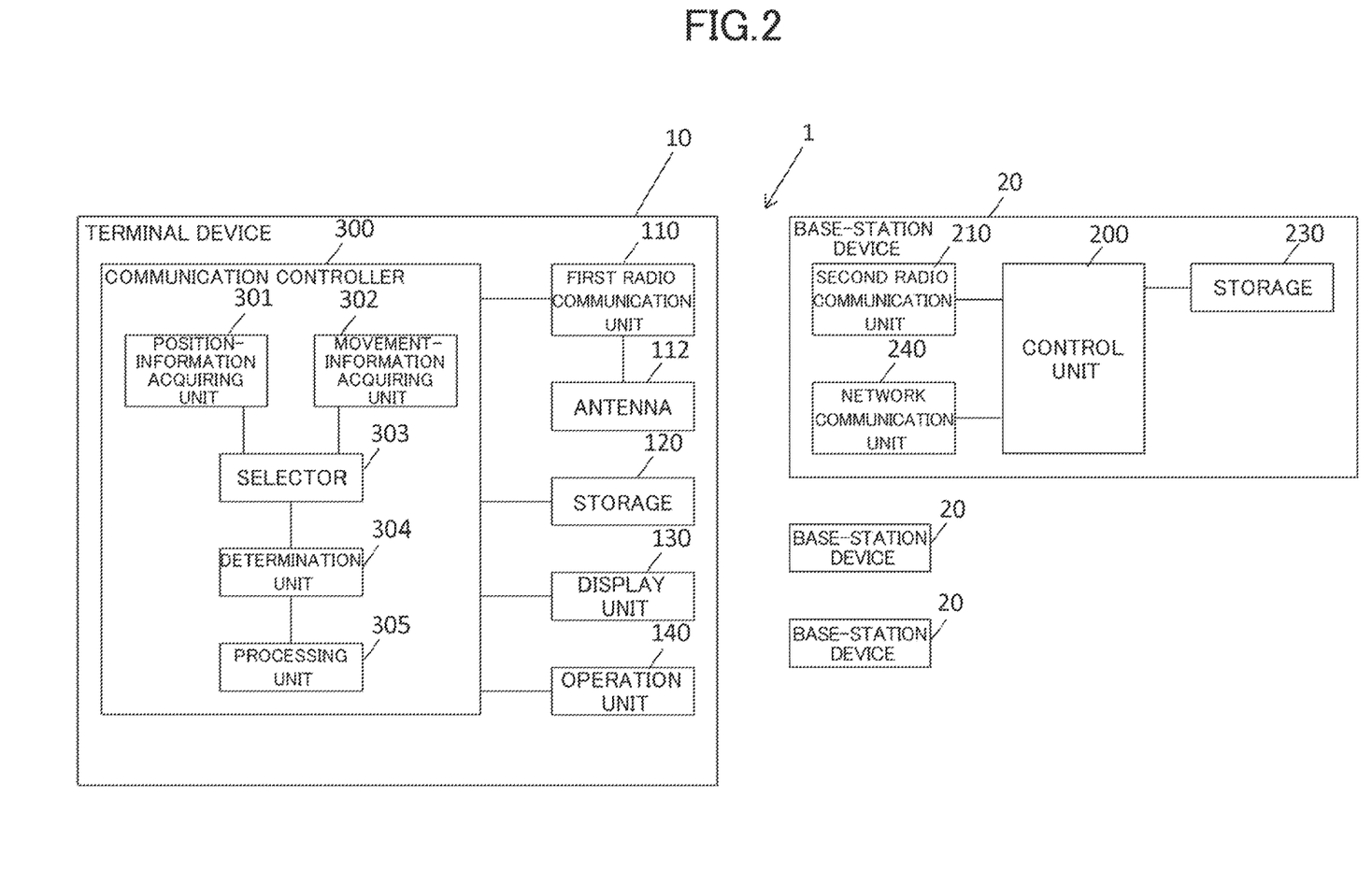
FIG. 2 is a block diagram of the communication system.

The communication system 1 in this preferred embodiment includes the terminal device 10 and the plurality of base-station devices 20. The terminal device 10 can communicate with the base-station devices 20.

The functional configuration of each device will be described with reference to FIG. 2. It is noted that functional units in the devices may be implemented by software as necessary. It is also noted that the functional units may be implemented by connecting an external device.

1.2.1 Terminal Device

The terminal device 10 includes a communication controller 300, a first radio communication unit 110, a storage 120, a display unit 130, and an operation unit 140.

The communication controller 300 reads and executes various programs stored in the storage 120 to implement various functions. The communication controller 300 includes one or more computing units (e.g., a CPU or central processing unit).

The storage 120 is a functional unit storing various programs and data pieces necessary for operating the terminal device 10. Although mainly consisting of, for instance, a semiconductor memory, the storage 120 may consist of a storage, such as a hard disk drive (HDD). In addition, an external storage such as an SD card may be used in combination as necessary, or a network storage (e.g., a Cloud storage) may be used as necessary. The communication controller 300 executes various processes in mobile radio communication. For instance, the communication controller 300 performs a handover between the terminal device 10 and the base-station devices 20. It is noted that a specific handover operation needs to be performed using any publicly known method in conformance with a mobile communication mode. The details of the communication controller 300 will be described later on.

The first radio communication unit 110 is connected to the base-station devices 20 to perform radio communication. The first radio communication unit 110 is connected to an antenna 112. The first radio communication unit 110 is connected to the base-station devices 20 in, for instance, a 5G communication mode, and communicates with other devices (e.g., a network device and an external server) using communication service. Whereas using the 5G communication mode, the first radio communication unit 110 may use other communication modes, including long-term evolution (LTE) and licensed-assisted access using LTE (LAA).

The display unit 130 displays various information pieces. The display unit 130 is, but not limited to, a liquid crystal display or an organic EL display. The operation unit 140 receives a user's operation input. The operation unit 140 is, but not limited to, a hardware key (e.g., an operation button and a key board), or a software key displayed on the display unit 130. The operation unit 140 can detect a user's touch operation and may serve as a touch panel together with the display unit 130 in an integrated manner.

The communication controller 300 reads and executes programs stored in the storage 120 to implement the functions of a position-information acquiring unit 301, a movement-information acquiring unit 302, a selector 303, a determination unit 304, and a processing unit 305.

The position-information acquiring unit 301 acquires position information of base-station devices. To be specific, the position-information acquiring unit 301 acquires, from the currently connected base-station device 20 via the first radio communication unit 110, position information of each of the surrounding base-station devices 20 while associating the position information with information about the identification of the corresponding base-station device 20.

The position information of each surrounding base-station device 20 is information that relates to where the surrounding base-station device 20 is located. In this preferred embodiment, the position information of each base-station device 20 includes direction information that indicates in which direction the base-station device 20 establishing a communication path to and from the terminal device 10 is located. That is, the direction information is information that indicates in which direction the base-station device 20 around the currently connected base-station device 20 is located. The direction information indicates the north, south, east and west of the currently connected base-station device 20 for instance. The direction information may indicate a subdivided direction, such as east-southeast.

The position information of each surrounding base-station device 20 may include angle information that indicates at which angle the surrounding base-station device 20 is located with the currently connected base-station device 20 being defined as the center and with due north being defined as zero degree. The position information of each surrounding base-station device 20 may include, for instance, coordinate information that indicates the latitude and longitude of the surrounding base-station device 20.

The movement-information acquiring unit 302 acquires movement information of the terminal device 10. The movement information of the terminal device 10 is information that relates to the movement of the terminal device 10 and includes moving direction, moving speed, and other information items. The movement-information acquiring unit 302 acquires the movement information of the terminal device 10 by, for instance, acquiring a history of data received by a global-positioning-system (GPS) receiver installed in the terminal device 10. The movement-information acquiring unit 302 may acquire the movement information by, for instance, acquiring a result detected by an accelerometer installed in the terminal device 10.

The movement information in this preferred embodiment includes travel information of the vehicle 5 equipped with the terminal device 10. The travel information of the vehicle 5 is information that relates to the travel of the vehicle 5 and includes the moving direction, moving speed and other information items of the vehicle 5. The movement-information acquiring unit 302 acquires the travel information via an intra-vehicle local area network (LAN), such as a controller area network (CAN) and FlexRay (registered trademark). The movement-information acquiring unit 302 may acquire the travel information from an electronic control unit (ECU) via on-board diagnostics (OBD).

The movement information (travel information) includes not only current information about movement, but also predicted information about movement. The movement-information acquiring unit 302 acquires blinker and steering-wheel operations as the travel information from an ECU for instance. The movement-information acquiring unit 302 also acquires, as the travel information, data captured by a camera installed in the vehicle 5. The movement-information acquiring unit 302 also acquires, as the travel information, data received by a UPS receiver in a car navigation system installed in the vehicle 5, information about a route to a destination, and other information items. For instance, let the vehicle 5 be traveling northward for heading to an intersection and be showing an operation for turning left (e.g., blinking the left blinker, detecting a steering-wheel operation, traveling on a left-turn-only lane, and a leftward curved road); accordingly, a predicted moving direction is left. The movement-information acquiring unit 302 in this case determines that the vehicle 5 will move to the west (left).

The movement-information acquiring unit 302 may determine the predicted moving direction when, for instance, either blinker operates for equal to or longer than a predetermined period of time. For instance, the movement-information acquiring unit 302 determines the predicted moving direction in response to a five or more-second blinker operation. Other than the foregoing, the movement-information acquiring unit 302 may determine the predicted moving direction on the basis of a steering-wheel operation.

For instance, the movement-information acquiring unit 302 may determine that the predicted moving direction is left, in response to a detection indicating a slight left-turn operation of the steering wheel. The movement-information acquiring unit 302 at this time may determine the predicted moving direction on the basis of both the speed of the vehicle 5 and the steering-wheel operation.

The movement-information acquiring unit 302 may determine the predicted moving direction by also using map information acquired from the car navigation system. In response to a blinker operation for vehicle stop or a blinker operation for entry into a frontage roadway for instance, the movement-information acquiring unit 302 can property determine the predicted traveling direction on the basis of a determination in conjunction with the map information.

The selector 303 selects, as a handover candidate, at least one base-station device 20 from among the plurality of base-station devices 20 on the basis of the position information acquired by the position-information acquiring unit 301 and on the basis of the movement information acquired by the movement-information acquiring unit 302.

To be specific, based on the position information acquired by the position-information acquiring unit 301, the selector 303 identifies the positions of the base-station devices 20 located around the currently connected base-station device 20. That is, the selector 303 identifies the positions of the plurality of base-station devices 20 available for handover. Based on the movement information acquired by the movement-information acquiring unit 302, the selector 303 then selects, as handover candidates, base-station devices 20 located in a moving direction of the terminal device 10 (vehicle 5) from among the handover-available base-station devices 20.

The determination unit 304 performs a cell search, in which the determination unit 304 searches the base-station devices 20 selected by the selector 303 for a base-station device 20 suitable as a handover destination. To be specific, the determination unit 304 measures, but not limited to, the intensity and quality (e.g., S/N ratio) of a signal sent and received between the base-station devices 20 selected by the selector 303 and the first radio communication unit 110. The determination unit 304 then determines, as a handover destination, a base-station device 20 having the best signal intensity and the best single quality of the base-station devices 20 selected by the selector 303.

The processing unit 305 performs a handover, in which the processing unit 305 changes the communication counterpart of the first radio communication unit 110 to the base-station device 20 determined by the determination unit 304.

1.2.2 Base-Station Device

Each base-station device 20 includes a controller 200, a second radio communication unit 210, a storage 230, and a network communication unit 240.

The controller 200 is a functional unit for overall control of the base-station device 20. The controller 200 reads and executes various programs stored in the storage 230 to implement various functions. The controller 200 includes one or more computing units a CPU or central processing unit).

The controller 200 also reads and executes a program stored in the storage 230 to implement the function of a radio-communication controlling unit. The radio-communication controlling unit performs a handover and controls mobile communication with the terminal device 10.

The second radio communication unit 210 communicates with the terminal device 10 located in an area where the base-station device 20 can communicate. The second radio communication unit 210 is connected to the terminal device 10 in, for instance, a 5G communication mode, and communicates with other devices (e.g., a network device and an external server) using communication service. Whereas using the 5G communication mode, the second radio communication unit 210 may use other communication modes, including LTE and licensed-assisted access using LTE (LAA).

The storage 230 is a functional unit storing various programs and data pieces necessary for operating the base-station device 20. The storage 230 consists of, but not limited to, a semiconductor memory or a hard disk drive (HDD).

The storage 230 has a position-information storing region for storing the position information of the surrounding base-station devices 20. The base-station device 20 sends the position information stored in the position-information storing region to the currently connected terminal device 10.

The network communication unit 240 communicates with, for instance, a network device (e.g., a position managing device and a subscriber managing device) located on a network and with a server device. For instance, the terminal device 10 connected to the base-station device 20 can be connected to network service via the network communication unit 240.

1.3 Example Operation

The following describes an example operation of the communication system 1 in this preferred embodiment.

1.3.1 First Example Operation

A first example operation of the communication system 1 in this preferred embodiment will be described with reference to FIGS. 1A and 3.

Figure 3:
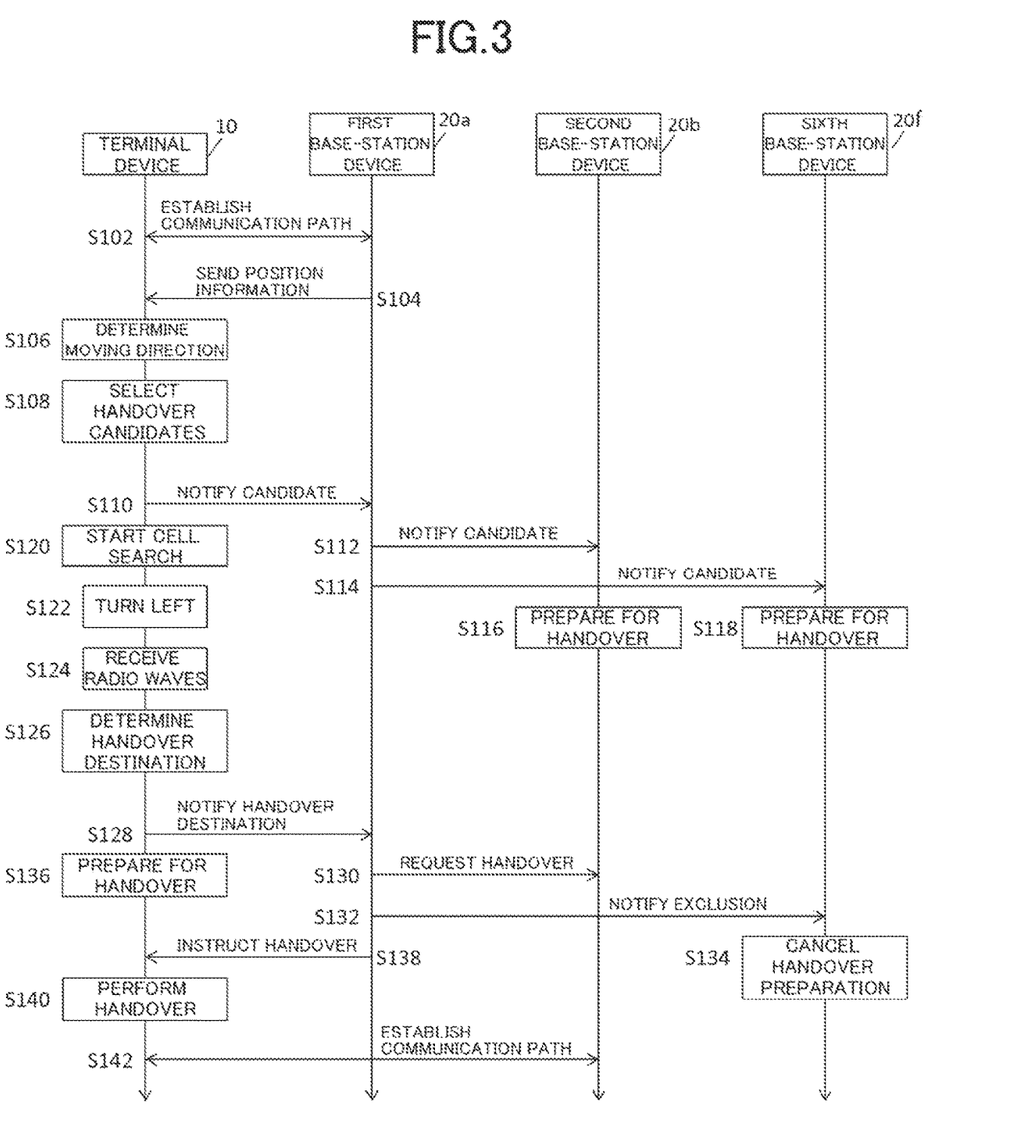
FIG. 3 is a sequence diagram of a first example operation of the communication system according to the first preferred embodiment.

FIG. 3 is a sequence diagram illustrating how the terminal device 10 now in communication with the first base-station device 20a performs a handover to its surrounding base-station device 20.

In S102, the terminal device 10 is firstly connected to the first base-station device 20a to establish a communication path. To be specific, the terminal device 10 is connected to the first base-station device 20a via the first radio communication unit 110, thus establishing a communication path to and from a network device (server device) via the first base-station device 20a. For convenience in description, the communication path herein refers to a communication path between the terminal device 10 and the base-station device 20.

In S104, the first base-station device 20a sends the position information of its surrounding base-station devices 20 to the terminal device 10. The position information includes direction information that indicates in which direction the surrounding base-station devices 20 are located with respect to the first base-station device 20a. The position-information acquiring unit 301 of the terminal device 10 acquires the position information sent from the first base-station device 20a via the first radio communication unit 110.

Herein, let the second to sixth base-station devices 20b to 20f be located around the first base-station device 20a (c.f., FIG. 1A). Accordingly, the position-information acquiring unit 301 acquires the position information indicating the positions (directions) where the second to sixth base-station devices 20b to 20f are located with respect to the first base-station device 20a (c.f., FIG. 1B).

The movement-information acquiring unit 302 of the terminal device 10 then acquires the movement information. In S106, the movement-information acquiring unit 302 determines a moving direction (including a predicted moving direction) of the terminal device 10 (vehicle 5) on the basis of the movement information.

Here, how the movement-information acquiring unit 302 determines the moving direction of the terminal device 10 (vehicle 5) using the movement information includes some methods listed below.

Detecting a direction-indication operation made by either blinker to determine the moving direction Detection a steering-wheel operation to determine the moving direction of the vehicle 5 (e.g., determining that the vehicle 5 will move right upon detecting a right turn of the steering wheel)

Determining the moving direction using information navigated by the car navigation system Determining the moving direction using a user's operation (e.g., an input operation and a voice operation)

Determining the moving direction using the motion of a driver's line of sight (e.g., looking at the right)

The movement-information acquiring unit 302 determines the moving direction on the basis of the foregoing movement information in this way. Herein, the vehicle 5 is traveling northward; let the movement-information acquiring unit 302 predict that the vehicle 5 will then turn left at an intersection to travel westward. As illustrated in FIGS. 1A and 1B, the second base-station device 20b and the sixth base-station device 20f are located in the west of the first base-station device 20a. In S108, the selector 303 selects the second and sixth base-station devices 20b and 20f, located in the direction where the terminal device 10 (vehicle 5) will travel (i.e., the west), as handover candidates from among the second to sixth base-station devices 20b to 20f.

In S110, the selector 303 notifies that the second and sixth base-station devices 20b and 20f are handover candidates to the first base-station device 20a via the first radio communication unit 110.

In S112, the first base-station device 20a notifies the second base-station device 20b of being selected as a handover candidate. In S114, the first base-station device 20a notifies the sixth base-station device 20f of being selected as a handover candidate. That is, the first base-station device 20a notifies that the terminal device 10 can execute a handover, to the second and sixth base-station devices 20b and 20f. In S116, the second base-station device 20b prepares for a handover to be executed by the terminal device 10. In S118, the sixth base-station device 20f prepares for a handover to be executed by the terminal device 10.

In S120, the determination unit 304 starts performing a cell search on the second and sixth base-station devices 20b and 20f, selected by the selector 303, The vehicle 5 then turns left, which is in S122, and in S124, the first radio communication unit 110 receives the radio waves of the second and sixth base-station devices 20b and 20f. In S126, let the determination unit 304 determine, based on the cell search results, the second base-station device 20b as a handover destination.

In S128, the determination unit 304 notifies that the second base-station device 20b has been determined as a handover destination, to the first base-station device 20a via the first radio communication unit 110.

In S130, the first base-station device 20a sends, to the second base-station device 20b, a handover request that requests the second base-station device 20b to accept a handover. In S132, the first base-station device 20a also notifies the sixth base-station device 20f of exclusion from a handover destination. In S134, the sixth base-station device 20*f* cancels its handover preparation in response to this notification.

In S136, in response to the determination on a handover destination, made by the determination unit 304, the processing unit 305 of the terminal device 10 prepares for a handover to the second base-station device 20*b*.

In S138, after sending the handover request to the second base-station device 20*b*, the first base-station device 20*a* instructs the terminal device 10 to execute a handover to the second base-station device 20*b*. In S140, the processing unit 305 of the terminal device 10 executes a handover to the second base-station device 20*b* in response to this instruction. This establishes a communication path between the terminal device 10 and the second base-station device 20*b*, which is in S142.

As such, the terminal device 10 in this preferred embodiment includes the communication controller 300. The communication controller 300 selects handover candidates from among the plurality of base-station devices 20 on the basis of the position information of each base-station device 20 and on the basis of the movement information of the terminal device 10 (vehicle 5). The communication controller 300 then performs a cell search on the handover candidates and determines one base-station device 20 that is a handover destination. That is, the communication controller 300 narrows the plurality of base-station devices 20 down to base-station devices 20 that undergo a cell search. This requires less processes and offers a more rapid determination of a handover-destination base-station device 20 than performing a cell search on all the plurality of base-station devices 20. Consequently, even when, for instance, the communication range of the base-station device 20 is narrow in 5G communication and the terminal device 10 is moving at high speed, communication during handover is less susceptible to interruption.

Although performing a cell search on only the second and sixth base-station devices 20*b* and 20*f*, selected by the selector 303, in the first example operation with reference to FIG. 3, the determination unit 304 may perform a cell search on any base-station device. For instance, the determination unit 304 may perform a cell search primarily on the second and sixth base-station devices 20*b* and 20*f*, selected by the selector 303, and when their cell search results do not meet a handover criterion, the determination unit 304 may perform a cell search on the other base-station devices 20. The determination unit 304 in this case may determine a handover destination from among the other base-station devices 20.

The order of the foregoing process steps is an example, and may be changed as appropriate.

1.3.2 Second Example Operation

Figure 4:
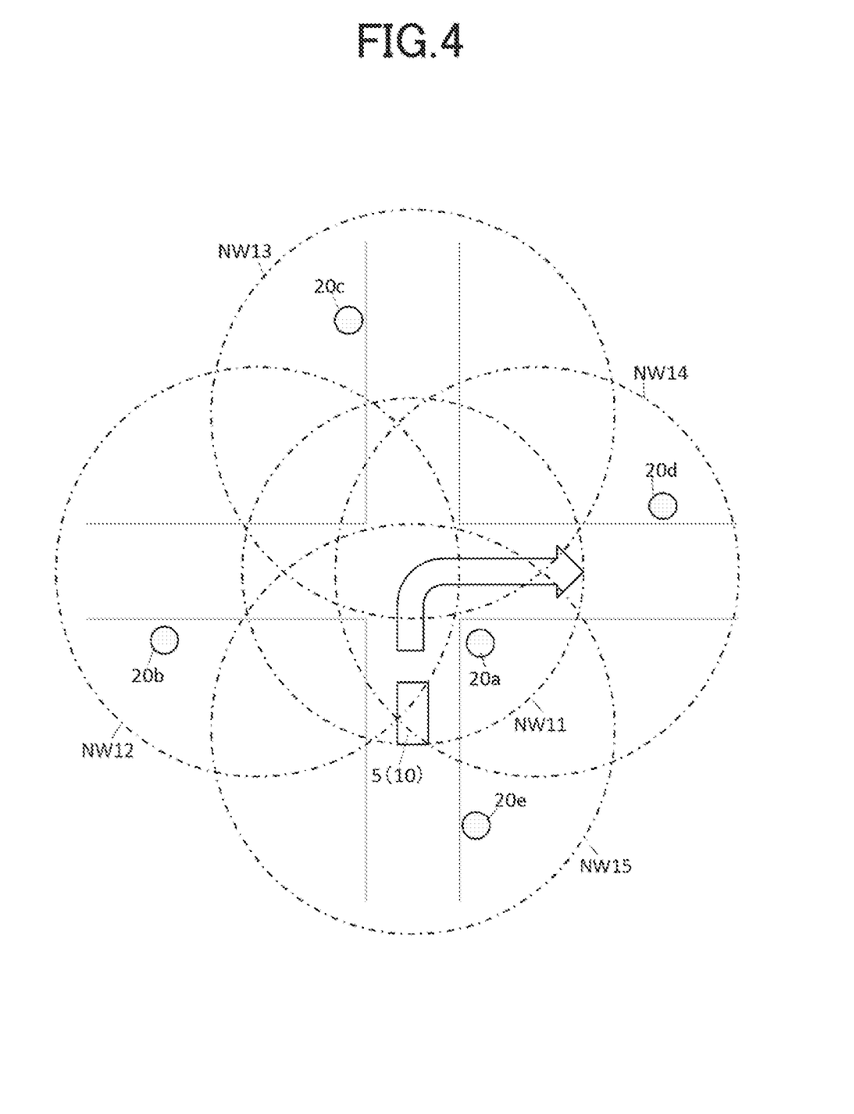
FIG. 4 illustrates a second example operation of the communication system according to the first preferred embodiment.

A second example operation of the communication system 1 will be described with reference to FIG. 4. The example in FIG. 4 shows that the communication areas NW11 to NW15 of the respective first to fifth base-station devices 20*a* to 20*e* each include an intersection. The example also shows that the vehicle 5 equipped with the terminal device 10 is traveling northward for heading to an intersection and is going to turn right at the intersection to travel eastward. The example also shows that the terminal device 10 has established a communication path to and from the first base-station device 20*a*.

Based on the position information of the second to fifth base-station devices 20*b* to 20*e*, acquired from the first base-station device 20*a*, and on the movement information of the terminal device 10, the communication controller 300 of the terminal device 10 selects handover candidates and performs a cell search on the candidates. While receiving the radio waves of the second to fifth base-station devices 20*b* to 20*e* near the intersection, the terminal device 10 performs a cell search on the fourth base-station device 20*d*, located in the east of the intersection. This offers a more rapid determination of a handover-destination base-station device 20 than performing a cell search on all the second to fifth base-station devices 20*b* to 20*e*.

1.3.3 Third Example Operation

Figure 5:
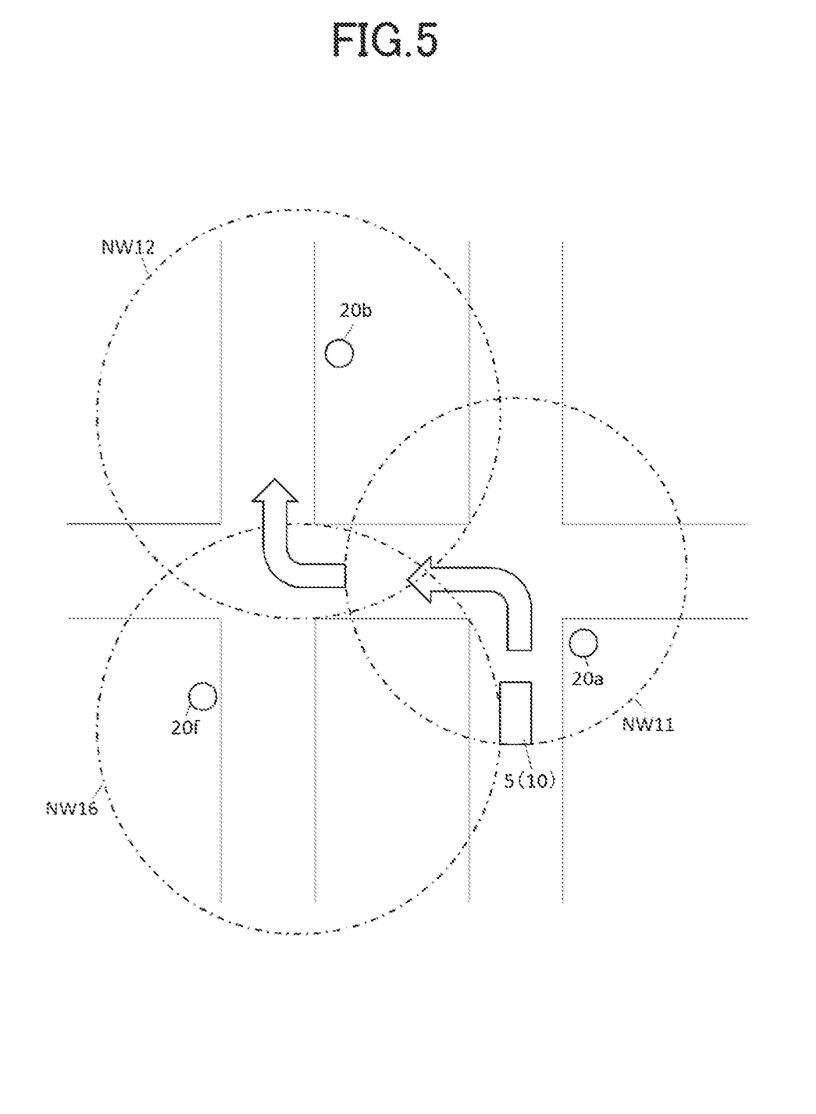
FIG. 5 illustrates a third example operation of the communication system according to the first preferred embodiment.

A third example operation of the communication system 1 will be described with reference to FIG. 5. The example in FIG. 5 shows that the vehicle 5 equipped with the terminal device 10 is traveling northward for heading to an intersection (first intersection) and is going to turn left at the first intersection to travel westward, followed by turning right at a second intersection to travel northward. The example also shows that the terminal device 10 has established a communication path to and from the first base-station device 20*a*. Here, FIG. 5 omits illustrating the third to fifth base-station devices 20*c* to 20*e*.

Based on the position information of the second to sixth base-station devices 20*b* to 20*f*, acquired from the first base-station device 20*a*, and on the movement information of the terminal device 10, the communication controller 300 of the terminal device 10 selects handover candidates and performs a cell search on the candidates. In this example operation, the vehicle 5 is predicted to turn left at the first intersection and to then turn right at the second intersection to travel northward. In the west of the first base-station device 20*a* is the second and sixth base-station devices 20*b* and 20*f*. The second base-station device 20*b* is located in the north from the sixth base-station device 20*f*. The terminal device 10 accordingly selects the second base-station device 20*b*, located in the northwest from the first base-station device 20*a*, as a handover candidate and performs a cell search on the second base-station device 20*b*.

As such, narrowing down the base-station devices 20 that undergo a cell search, on the basis of a prediction about the movement of the terminal device 10 offers a rapid determination of a base-station device 20 that is a handover destination.

2. Second Preferred Embodiment

Figure 6:
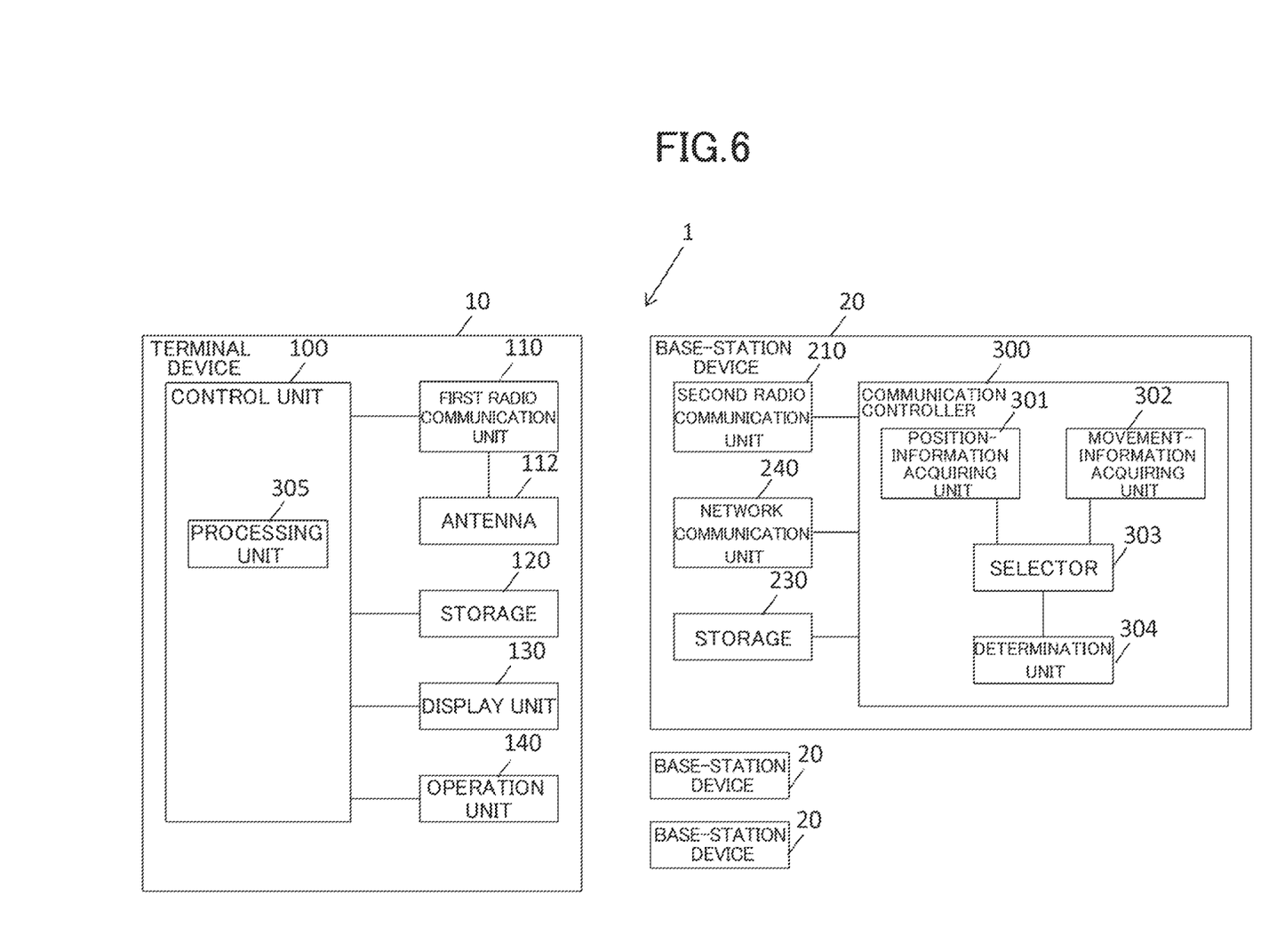
FIG. 6 is a block diagram of a communication system according to a second preferred embodiment.

The communication system 1 according to a second preferred embodiment will be described with reference to FIG. 6.

The communication system 1 in this preferred embodiment is different from that in the first preferred embodiment in that each base-station device 20 includes the communication controller 300. Components similar to those described in the first preferred embodiment will be denoted by the same signs and will not be elaborated upon.

The terminal device 10 in this preferred embodiment includes a control unit 100. The control unit 100 reads and executes various programs stored in the storage 120 to implement various functions. The control unit 100 includes one or more computing units (e.g., a CPU or central processing unit).

The control unit 100 reads and executes a program stored in the storage 120 to implement the function of the processing unit 305.

The processing unit 305 performs a handover, in which the processing unit 305 changes the communication counterpart of the first radio communication unit 110 to a handover-destination base-station device 20 determined by the base-station device 20.

The terminal device 10 in this preferred embodiment sends the movement information to the base-station device 20.

Each base-station device 20 includes the communication controller 300. The communication controller 300 reads and executes various programs stored in the storage 230 to implement various functions. The communication controller 300 includes one or more computing units (e.g., a CPU or central processing unit).

The communication controller 300 reads and executes programs stored in the storage 230 to implement the functions of the position-information acquiring unit 301, the movement-information acquiring unit 302, the selector 303, and the determination unit 304.

The position-information acquiring unit 301 acquires the position information of the surrounding base-station devices 20 from a position-information storing region of the storage 230.

The movement-information acquiring unit 302 acquires the movement information from the terminal device 10 via the second radio communication unit 210.

The selector 303 selects, as a handover candidate, at least one base-station device 20 from among the plurality of base-station devices 20 on the basis of the position information acquired by the position-information acquiring unit 301 and on the basis of the movement information acquired by the movement-information acquiring unit 302.

The determination unit 304 instructs the terminal device 10 to perform a cell search. To be specific, the determination unit 304 instructs the terminal device 10 to perform a cell search on base-station devices 20 selected by the selector 303, and receives cell search results. The determination unit 304 then determines one of the base-station devices 20 selected by the selector 303, as a handover destination on the basis of the cell search results. The determination unit 304 notifies the terminal device 10 of the determined handover-destination base-station device 20, and instructs the terminal device 10 to perform a handover to the determined base-station device 20.

An example operation of the communication system 1 in this preferred embodiment will be described with reference to FIG. 1A and FIG. 7.

Figure 7:
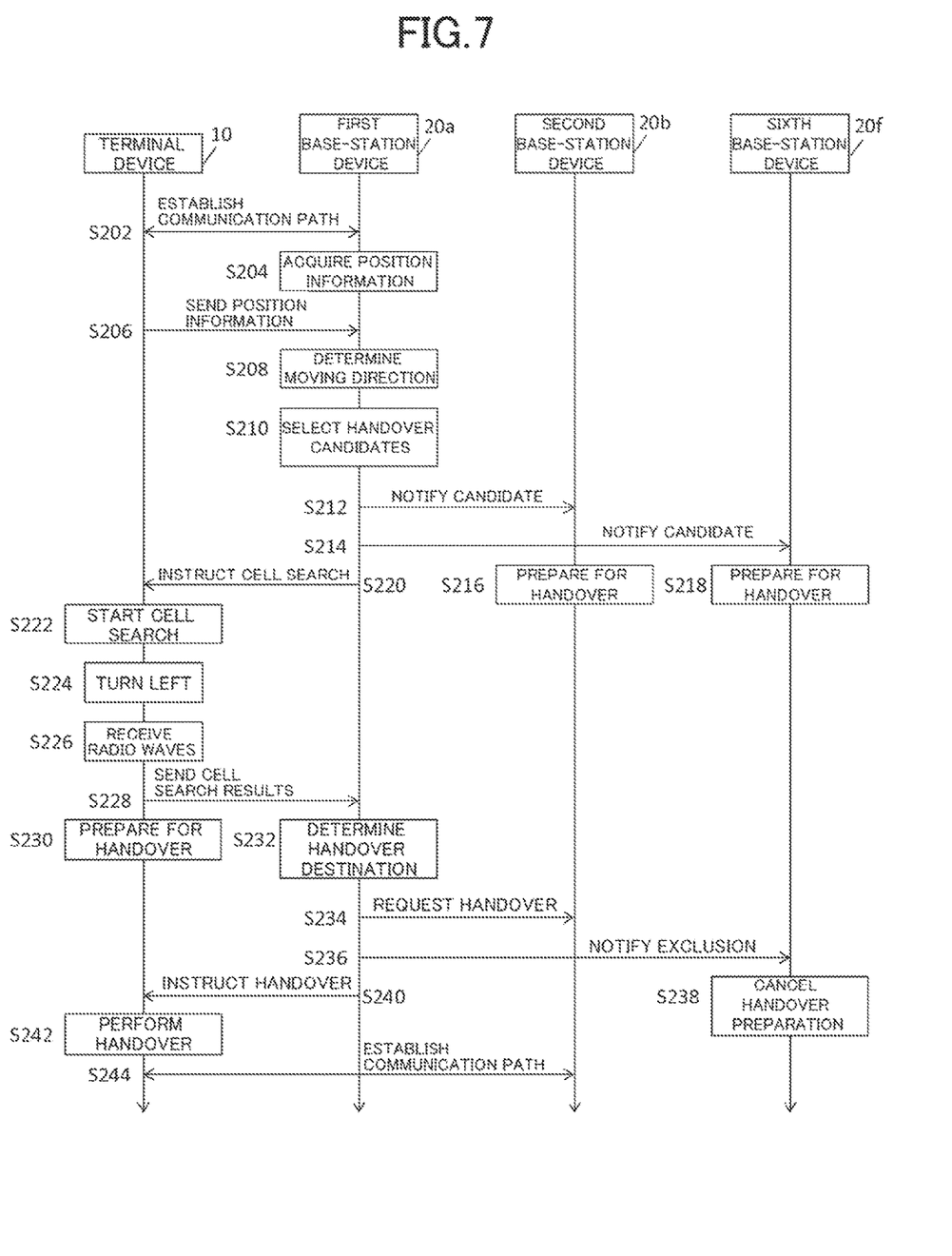
FIG. 7 is a sequence diagram of an example operation of the communication system.

FIG. 7 is a sequence diagram illustrating how the terminal device 10 now in communication with the first base-station device 20a performs a handover to its surrounding base-station device 20.

In S202, the terminal device 10 is firstly connected to the first base-station device 20a to establish a communication path. To be specific, the terminal device 10 is connected to the first base-station device 20a via the first radio communication unit 110, thus establishing a communication path to and from a network device (server device) via the first base-station device 20a. For convenience in description, the communication path herein refers to a communication path between the terminal device 10 and the base-station device 20.

In S204, the position-information acquiring unit 301 of the first base-station device 20a acquires the position information of the surrounding base-station devices 20 from the position-information storing region of the storage 230. The position information includes direction information that indicates in which direction the surrounding base-station devices 20 are located with respect to the first base-station device 20a. Herein, let the second to sixth base-station devices 20b to 20f be located around the first base-station device 20a (c.f., FIG. 1A). The position-information acquiring unit 301 acquires the position information indicating the positions (directions) where the second to sixth base-station devices 20b to 20f are located with respect to the first base-station device 20a (c.f., FIG. 1B).

In S206, the terminal device 10 sends its movement information to the first base-station device 20a. In S208, the movement-information acquiring unit 302 of the first base-station device 20a acquires the movement information via the second radio communication unit 210, and determines a moving direction (including a predicted moving direction) of the terminal device 10 (vehicle 5) on the basis of the movement information.

Herein, the vehicle 5 is traveling northward; let the movement-information acquiring unit 302 predict that the vehicle 5 will then turn left at an intersection to travel westward.

As illustrated in FIGS. 1A and 1B, in the west of the first base-station device 20a is the second and sixth base-station devices 20b and 20f. In S210, the selector 303 selects the second and sixth base-station devices 20b and 20f, located in the direction where the terminal device 10 (vehicle 5) will travel (i.e., the west), as handover candidates from among the second to sixth base-station devices 20b to 20f.

In S212, the first base-station device 20a notifies the second base-station device 20b of being selected as a handover candidate. In S214, the first base-station device 20a notifies the sixth base-station device 20f of being selected as a handover candidate. That is, the first base-station device 20a notifies that the terminal device 10 can execute a handover, to the second and sixth base-station devices 20h and 20f. In S216, the second base-station device 20b prepares for a handover to be executed by the terminal device 10. In S218, the sixth base-station device 20f prepares for a handover to be executed by the terminal device 10.

In S220, the determination unit 304 instructs the terminal device 10 to perform a cell search. In S222, the terminal device 10 starts performing a cell search on the second and sixth base-station devices 20h and 20f, selected by the selector 303. The vehicle 5 then turns left, which is in S224, and in S226, the first radio communication unit 110 receives the radio waves of the second and sixth base-station devices 20b and 20f. In S228, the terminal device 10 sends the cell search results to the first base-station device 20a. In S230, the terminal device 10 also prepares for a handover after sending the cell search results.

Based on the cell search results, the determination unit 304 of the first base-station device 20a determines a base-station device 20 that is a handover destination. In S232, let the determination unit 304 determine the second base-station device 20b as a handover destination on the basis of the cell search results.

In S234, the first base-station device 20a sends, to the second base-station device 20b, a handover request that requests the second base-station device 20b to accept a handover. In S236, the first base-station device 20a also notifies the sixth base-station device 20f of exclusion from a handover destination. In S238, the sixth base-station device 20f cancels its handover preparation in response to this notification.

In S240, after sending the handover request to the second base-station device 20b, the first base-station device 20a instructs the terminal device 10 to execute a handover to the second base-station device 20b. In S242, the processing unit 305 of the terminal device 10 executes a handover to the second base-station device 20b in response to this instruction. This establishes a communication path between the terminal device 10 and the second base-station device 20b, which is in S244.

As such, each base-station device 20 includes the communication controller 300. The communication controller 300 selects handover candidates from among the plurality of base-station devices 20 on the basis of the position information of each base-station device 20 and on the basis of the movement information of the terminal device 10 (vehicle 5). The communication controller 300 then performs a cell search on the handover candidates and determines one base-station device 20 that is a handover destination. That is, the communication controller 300 narrows the plurality of base-station devices 20 down to base-station devices 20 that undergo a cell search. This requires less processes and offers a more rapid determination of a handover-destination base-station device 20 than performing a cell search on all the plurality of base-station devices 20. Consequently, even when, for instance, the communication range of the base-station device 20 is narrow in 5G communication and the terminal device 10 is moving at high speed, communication during handover is less susceptible to interruption.

Although included in the first base-station device 20a in this preferred embodiment, the determination unit 304 may be included in the terminal device 10, and the determination unit 304 of the terminal device 10 may determine a handover-destination base-station device 20 on the basis of the cell search results. That is, the function of the communication controller 300 may be decentralized into the terminal device 10 and the base-station device 20.

3. Modifications

Modifications of the communication system 1 will be described. The Mowing modifications are each applicable in combination, as necessary, with the configurations described in the foregoing preferred embodiments or with any of the modifications.

Although included in the terminal device 10 or each base-station device 20 in the foregoing examples, the communication controller 300 may be included in, but not limited to, a server (including a cloud server).

Although installed in the vehicle 5, which is a mobile object, in the foregoing examples, the terminal device 10 may be installed in other mobile objects (e.g., a motorcycle and a railroad vehicle). In addition, the terminal device 10 does not have to be installed in a mobile object; it may be carried by a person for instance.

The vehicle 5 per se may function as the terminal device 10. That is, the vehicle 5 (terminal device 10) may be a connected car.

Programs that operate in the individual devices in the preferred embodiments are programs that control a computing unit (i.e., programs that cause a computer to function), such as a CPU, so that the functions described in the foregoing preferred embodiments are achieved. At the time of this processing, information handled in these devices temporally accumulates in a temporal storage (e.g., a RAM), is then stored in various storages such as a ROM, an HDD, and an SSD, and is read by the CPU as necessary to undergo correction and writing.

For market distribution, these programs can be stored in a portable storing medium or transferred to a server computer connected via a network, such as the Internet. In this case, a storage in the server computer is included in the present invention as a matter of course.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A communication controller comprising:
a position-information acquiring unit configured to acquire position information of each of a plurality of base-station devices;
a movement-information acquiring unit configured to acquire movement information of a terminal device;
a selector configured to select, as cell search targets that are handover candidates, some base-station devices from among the plurality of base-station devices in accordance with the position information and the movement information; and
a determination unit configured to determine a base-station device that is a handover destination, in accordance with a result of a cell search performed on the some base-station devices selected by the selector.

2. The communication controller according to claim 1, wherein the movement information includes travel information of a vehicle equipped with the terminal device.

3. The communication controller according to claim 1, wherein the position information of each of the plurality of base-station devices includes direction information that indicates in which direction each of the plurality of base-station devices establishing a communication path to and from the terminal device is located.

4. A terminal device comprising:
the communication controller according to claim 1; and
a first radio communication unit capable of communicating with a plurality of base-station devices.

5. A base-station device comprising:
the communication controller according to claim 1; and
a second radio communication unit capable of communicating with a terminal device.

* * * * *